(12) United States Patent
Ducharme et al.

(10) Patent No.: US 8,594,333 B2
(45) Date of Patent: Nov. 26, 2013

(54) SECURE KEY ACCESS WITH ONE-TIME PROGRAMMABLE MEMORY AND APPLICATIONS THEREOF

(75) Inventors: Paul D. Ducharme, Richmond Hill (CA); Wendy Wai Yin Cheung, Toronto (CA); Albert Yunsang Wong, Toronto (CA); Shijun Huang, Markham (CA); Norman V. D. Stewart, Toronto (CA)

(73) Assignee: VIXS Systems, Inc, Toronto, Ontario (CA)

(*) Notice: Subject to any disclaimer, the term of this patent is extended or adjusted under 35 U.S.C. 154(b) by 746 days.

(21) Appl. No.: 12/651,996

(22) Filed: Jan. 4, 2010

(65) Prior Publication Data

US 2010/0189262 A1    Jul. 29, 2010

Related U.S. Application Data

(63) Continuation-in-part of application No. 12/490,777, filed on Jun. 24, 2009.

(60) Provisional application No. 61/094,541, filed on Sep. 5, 2008.

(51) Int. Cl.
*G06F 21/00* (2013.01)

(52) U.S. Cl.
USPC .......................................... 380/277; 713/183

(58) Field of Classification Search
None
See application file for complete search history.

(56) References Cited

U.S. PATENT DOCUMENTS

| | | | |
|---|---|---|---|
| 6,222,529 B1* | 4/2001 | Ouatu-Lascar et al. | 715/745 |
| 2002/0002684 A1* | 1/2002 | Fox et al. | 713/200 |
| 2004/0133632 A1* | 7/2004 | Messerges et al. | 709/203 |
| 2005/0005131 A1* | 1/2005 | Yoshida et al. | 713/183 |
| 2006/0109826 A1* | 5/2006 | Zhang | 370/338 |
| 2006/0265733 A1* | 11/2006 | Chen et al. | 726/1 |
| 2007/0174621 A1 | 7/2007 | Ducharme | |
| 2007/0192610 A1 | 8/2007 | Chun et al. | |
| 2007/0226400 A1* | 9/2007 | Tsukazaki | 711/102 |

FOREIGN PATENT DOCUMENTS

| | | |
|---|---|---|
| EP | 1560361 A1 | 8/2005 |
| WO | 2008008244 A2 | 1/2008 |
| WO | 2008071572 A1 | 6/2008 |

OTHER PUBLICATIONS

Schneier, Applied Crytography, 1996, pp. 38-40.*
Extended European Search Report; EP Application No. 11150129. 2-1247, Sep. 23, 2011; 7 pages.

* cited by examiner

*Primary Examiner* — Edan Orgad
*Assistant Examiner* — Brian Olion
(74) *Attorney, Agent, or Firm* — Garlick & Markison; Bruce E. Stuckman

(57) ABSTRACT

A device includes a key store memory that stores one or more cryptographic keys. A rule set memory stores a set of rules for accessing the cryptographic keys. A key store arbitration module grants access to the cryptographic keys in accordance with the set of rules. The device can be used in conjunction with a key ladder. The device can include a one-time programmable memory and a load module that transfers the cryptographic keys from the one one-time programmable memory to the key store memory and the set of rules to the rule set memory. A validation module can validate the cryptographic keys and the set of rules stored in the key store and rule set memories, based on a signature defined by a signature rule.

5 Claims, 11 Drawing Sheets

SECURE KEY ACCESS WITH ONE-TIME PROGRAMMABLE MEMORY AND APPLICATIONS THEREOF

CROSS REFERENCE TO RELATED PATENTS

This patent application is claiming priority under 35 USC §120 as a continuation-in-part of the copending application entitled, "DEVICE WITH PRIVILEGED MEMORY AND APPLICATIONS THEREOF," having Ser. No. 12/490,777, filed on Jun. 24, 2009 that itself claims priority under 35 USC §119 to a provisionally filed patent application entitled "Secure Methods for System on a Chip Cryptographic Key Access and Storage", having a provisional filing date of Sep. 5, 2008, and a provisional Ser. No. 61/094,541.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates to generally devices that include memory and more particularly to securing access to the memory within the device.

2. Description of Related Art

The desire to keep video content of DVD's (and/or other copyrighted or proprietary information that is stored in a digital format) secure from unauthorized use (e.g., unauthorized copying, distribution, etc.) is driven by a sector of the population that places little to no value on the intellectual properties rights of others. As such, the battle between creating security systems for digital information and the hackers that attempt to break them continues.

This battle is intensifying with the integration of electronic device features being implemented on a single device (e.g., computer with DVD functionality) and is further intensified by video processing hardware being implemented as stand-alone system on a chip (SOC) devices. In many instances, the video processing hardware SOC uses an operating system that allows end users to write their own applications, which means that the user's application may share the same processors and memory space as the security system. This makes the security operations vulnerable. To reduce the vulnerability, video processing hardware needs to be constrained to performing only specific intended types of cryptographic operations.

In addition, video processing devices, which include the video processing hardware SOC, are embedded with licensed secret keys for compliance with one or more of a plurality of video application standards (e.g., BD, DTCP, CPRM, Cable Card, etc.). Typically, such a video application standard includes a revocation mechanism whereby, if a secret key value is made public, the security functions of the compromised devices are revoked and the devices are rendered inoperable. As such, it is highly desirable that the secret keys are stored in such a way that they are not accessible to the firmware of the device (in order to avoid revocation). This is typically done by storing the secret keys in a one-time programmable (OTP) memory.

While using OTP memory has become a primary mechanism for storing secret keys within video processing devices, it is not a failsafe approach. For example, a security issue arises when multiple cryptographic clients (e.g., a hardware block that performs a specific cryptographic algorithm such as RSA, TSD, ECC, DMA, etc. . . . ) may issue read or write requests to the OTP memory asynchronously and that the requests are not atomic. In addition, as a result of granularity associated with OTP memory large key values are partitioned into smaller blocks, which have special read/write rules that are imposed on every block. Thus, it becomes necessary to associate a macro level restriction on cryptographic clients down to every micro level block access performed by the client.

As a specific example, the RSA algorithm can perform a 2048 bit RSA operation, which requires 32 reads of 64 bit blocks from the key store to assemble the exponent. If a key is intended to be used as a 2048 bit exponent, then every 64 bit block read must be associated with the intended purpose of the key; i.e. blocks have to have an attribute indicating which cryptographic client is permitted to access a particular block associated with a larger key.

Another security problem is that cryptographic strength often relies on using large keys (e.g., up to 2048 bits for RSA or 256 bit for some AES modes). However, if the large key is used one 64 bit block at a time by a weaker cryptographic client, then large keys may be attacked 64 bits (or less) a time. Yet another way to attack large keys is to overwrite portions of the key with 0's, and then perform the intended operations, but with the remainder of the weakened key. Every time a portion of the key is decimated in this way, the remainder can be determined because portions of the key are now known.

Still further, some cryptographic clients have the ability to perform operation at various levels of strength; for example, the RSA can be configured for variable size modulus or 3DES can be degraded into a DES operation. This can be exploited by a hacker to perform weaker operations and thereby attack large keys with degraded operations. Even further, some cryptographic clients use control words (CWs) and initial vectors (IVs) within the security operations. The integrity of a security system may be attacked by using a CW as an IV in an operation where the clear text and the CW are known, which could be used to reveal the CW value.

Another important aspect of maintaining the integrity of cryptographic operations is controlling the destination of the cryptographic operation results. For example, content exported from the SOC poses a far greater risk than content which is retained within the SOC. Yet another mode of attack involves using a key, a CW or an IV to decrypt content instead of encrypting the content. For example the intention may be to encrypt content however a hacker may use a key store value to decrypt the content.

In addition to the threat of hackers, the security of the secure content information is at risk from unauthorized public disclosure. For example, if a disgruntled employee posts the algorithm and location of the keys on the Internet, the security of the algorithm is lost. As such, the risk to security systems is not just from outsider breaking the security of the algorithm, but also from an insider intentionally compromising the integrity of the security system.

Therefore, a need exists for a security device architecture that at least partially overcomes one or more of the above mentioned security issues.

BRIEF DESCRIPTION OF THE SEVERAL VIEWS OF THE DRAWING(S)

DETAILED DESCRIPTION OF THE INVENTION

Figure 1:
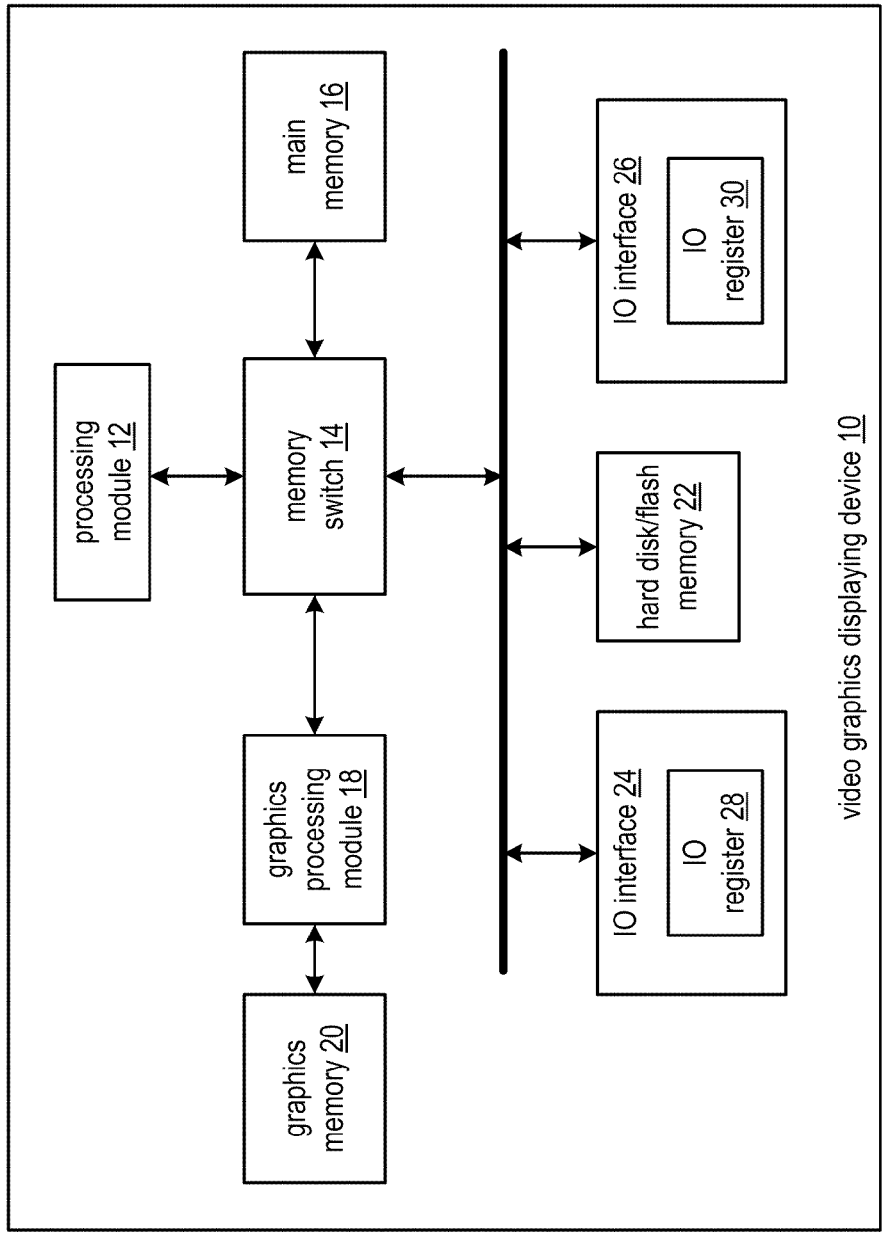
FIG. 1 is a schematic block diagram of an embodiment of a video graphics display device in accordance with the present invention.

FIG. 1 is a schematic block diagram of an embodiment of a video graphics display device 10 that includes a processing module 12, a memory switch 14, main memory 16, a graphics processing module 18, graphics memory 20, a hard disk and/or flash memory 22, and input/output (IO) interfaces 24 and 26. Each of the IO interfaces 24 and 26 includes an IO register 28 and 30, respectively. Note that the video graphics display device 10 may be a computer, a laptop computer, a DVD player, a portable digital audio/video player, etc. and may include multiple IO interfaces 24 and 26. Further note that each IO interface 24 and 26 may include a plurality of IO registers 28 and 30.

The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-16.

In an example of operation, one or more of the IO interfaces receives an instruction to display a video file. The video file may be from a DVD, stored in the hard disk and/or flash memory, received from a satellite receiver, received from a cable set top box, and/or any other source of video content data. Note that the one or more of the IO interfaces 24 and/or 26 may receive the video file. The video file is encrypted using a particular encryption program and one or more cryptographic keys as prescribed by one or more video standards.

In this example, the processing module 12 coordinates the retrieval of the video file from the main memory 16, the hard disk and/or flash memory 22, the IO interface 24 and/or 26, and/or other source. The encrypted video file may include video data, audio data, video graphics data and/or any other type of data requiring security. The processing module 12 evokes a cryptographic client algorithm (e.g., RSA, DES, etc.) and retrieves a cryptographic key from a secure memory location (e.g., a privileged memory). The secure memory location will be described below with reference to one or more of FIGS. 2-16.

The processing module 12 decrypts the encrypted data using the cryptographic client algorithm and the cryptographic key to produce decrypted data. The decrypted data is provided the graphics processing module 18. The video graphics processing module 18 may be a video graphics card, a video graphics engine, a video graphics processor, a combination thereof, and/or any other device for rendering video data. In this example, the graphics processing module 18 converts the decrypted data into video data and stores it in the graphics memory 20 for subsequent display.

The video graphics display device 10 has three classes of memory access. The most secure class allows access to the system memory (e.g., main memory 16 and/or the hard disk and/or flash memory 22) and to IO devices via the IO interfaces 24 and 26; allows access to the graphics memory 20 (e.g., frame buffer); and allows access to the secure memory location. The next level of secure access allows access to the system memory and to IO devices via the IO interfaces 24 and 26. The third access level allows access to system memory.

Figure 2:
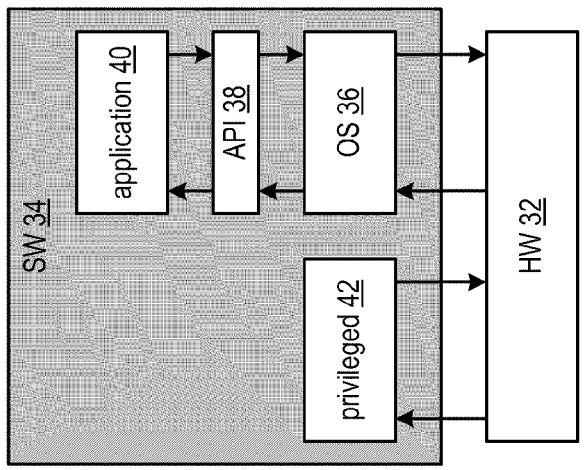
FIG. 2 is a schematic block diagram of an embodiment of a device in accordance with the present invention.

FIG. 2 is a schematic block diagram of an embodiment of a device that includes a hardware (HW) section 32 (e.g., the processing module 12, the memory switch 14, the graphics processing module 18, IO interfaces 24 and 26, etc.) and a software (SW) section 34 that is stored in the system memory (e.g., main memory 16 and/or the hard disk and/or flash memory 22). The software section 34 includes one or more operating systems (OS) 36, application programming interface (API) section 38, an application section 40, and a privileged section 42. The software section 34 may be stored in the memory of device (e.g., the main memory 16, the graphics memory 20, the hard disk/flash memory 22, and/or the IO registers 28 and 30 of device 10). The privileged memory section 42 may be within the memory of the device and/or within a one-time programmable memory.

Figure 3:
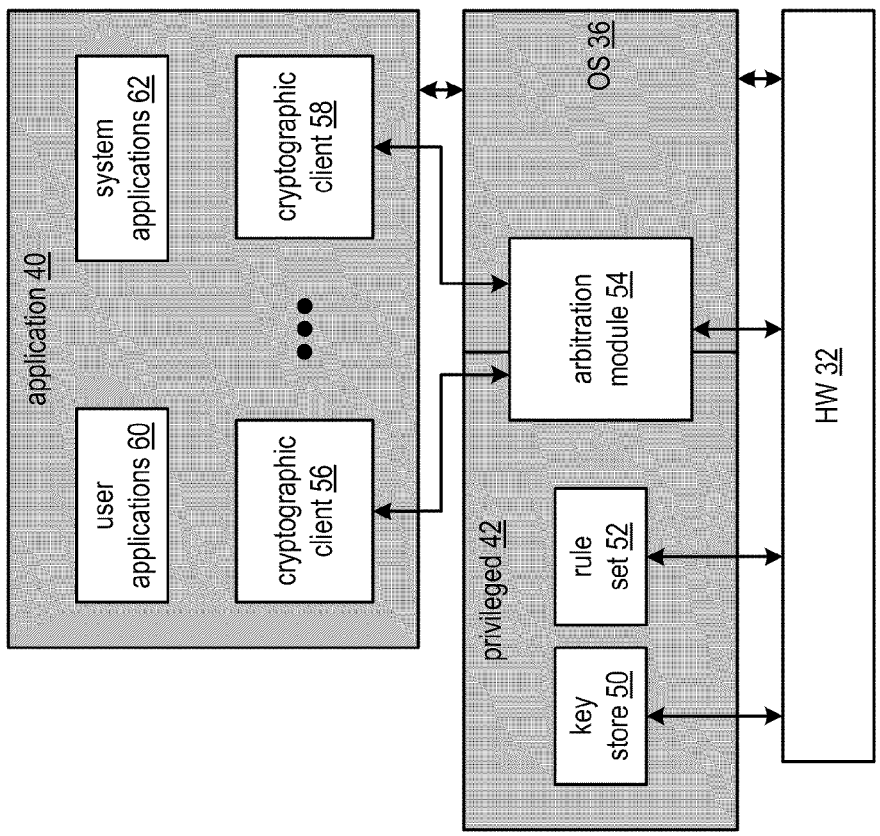
FIG. 3 is a schematic block diagram of another embodiment of a device in accordance with the present invention.

FIG. 3 is a schematic block diagram of another embodiment of a device that includes the hardware section (HW) 32 and the software section (SW) 34. In this embodiment, the software section 34 includes application section 40, an operating system 36, and the privileged section 42. The application section 40 includes a plurality of user applications 60, a plurality of system applications 62, and a plurality of cryptographic client applications 56-58. The plurality of cryptographic applications includes two or more of AES (advanced encryption standard), DES (data encryption standard), 3DES, Multi-2 encryption, DVB (digital video broadcasting), C2 (cryptomeria cipher), CSS (content scramble system), MDMI (HDCP), 1394(M6), RSA, ECC (elliptical curve cryptography), Register, any variations thereof, any further versions thereof, and/or any new encryption standards or techniques.

The privileged memory section 42 may be implemented using one or more one-time programmable (OTP) memories, RAM, and/or ROM. The OTP memory may be used to store a default set of the cryptographic keys and a rule set section 52. The key store section 50 stores one or more cryptographic keys for one or more of the cryptographic clients in an OTP memory, RAM, and/or ROM. The key store section 50 may include memory blocks, where one or more blocks store a cryptographic key. The rule set section 52 stores rules for accessing the key store section 50. The various rules will be described in greater detail with reference to at least some of FIGS. 4-16.

The device of FIG. 3 also includes an arbitration module 54, which may be part of the operation system 36, stored in the privileged memory 42, and/or a separate module (e.g., a stand-alone state machine, a stand-alone processor, etc.). Regardless of its location, the arbitration module coordinates access to the key store section 50 based on the rule set. In this manner, access requests must come from authorized firmware components (e.g., real cryptographic clients) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

With such an embodiment, the security of a hardware system and the flexibility of a software system are substantially achieved. For instance, by utilizing a single OTP to store permanent rules for accessing the keys, the vulnerability of a software system is substantially avoided and the inflexibility of a hardware system, which uses hard wired single function for a single standard, is also substantially avoided.

Figure 4:
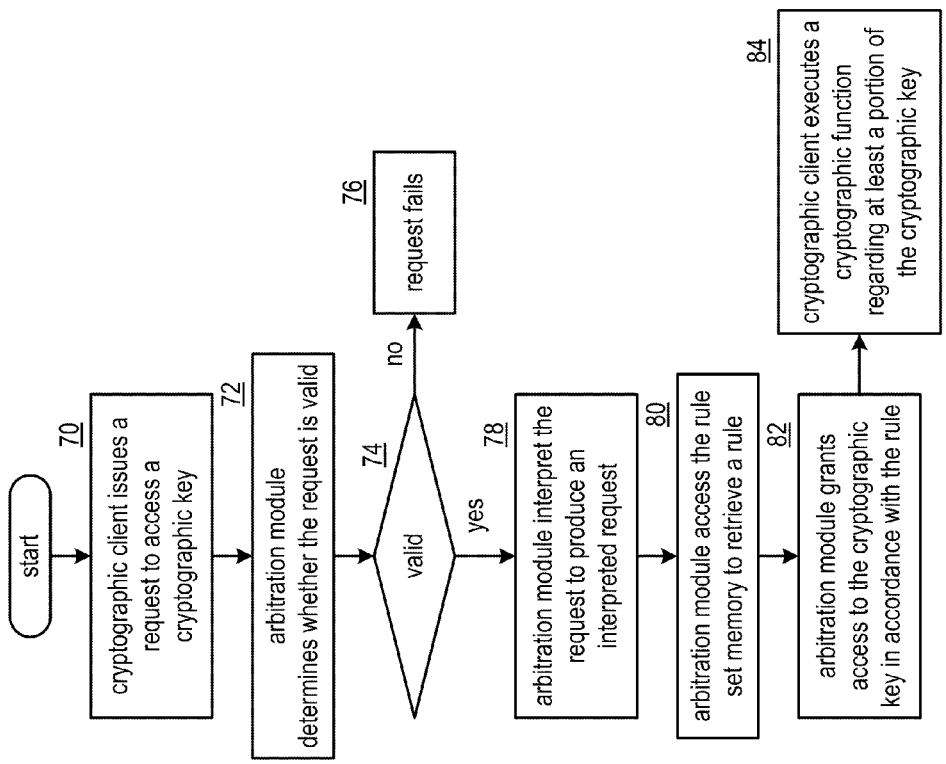
FIG. 4 is a logic diagram of an embodiment of a method for accessing a cryptographic key in accordance with the present invention.

FIG. 4 is a logic diagram of an embodiment of a method for accessing a cryptographic key that begins at step 70 where a cryptographic client issues a request to access a cryptographic key of the cryptographic keys. The request should be in a specific format that includes a read/write indication, an address of the at least a portion of the cryptographic key, a source or destination of the cryptographic result, and identification of a cryptographic algorithm corresponding to the cryptographic function if the source is adjacent to the destination and is the key store content is a Key/CW or an IV. The method then proceeds to step 72 where a key store arbitration module 54 determines whether the request to access the cryptographic key is valid. For example, if the request is not from an authorized entity (e.g., firmware implementing a function such as a cryptographic client), the arbitration module will indicate that the request is not valid. As such, a hacker's attempt to access the key store section will be invalid and will fail as shown at step 76.

If, however, at step 74 the request is determined to be valid, the method continues at step 78 where the arbitration module interprets the request for access to the cryptographic key to produce an interpreted request. This will be described in greater detail with reference to FIG. 9. The method continues at step 80 where the arbitration module accesses the rule set memory based on the interpreted request to retrieve a rule of the set of rules. An example of a rule will be described with reference to FIG. 6.

The method continues at step 82 where the arbitration module grants access to the cryptographic key in accordance with the rule. Note that the rule set may indicate that the access is not to be granted, as such, in accordance with the rule includes denying the request, ignoring the request, or providing random data. The method continues at step 84 where, when access to the cryptographic key is granted, the cryptographic client executes a cryptographic function regarding at least a portion of the cryptographic key to produce a cryptographic result.

Figure 5:
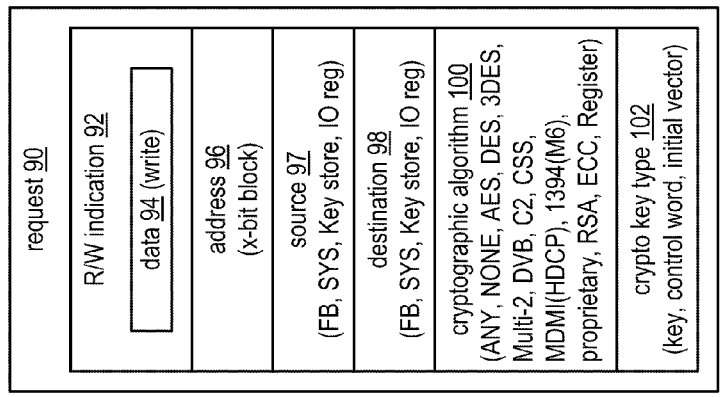
FIG. 5 is a diagram of an example of a request in accordance with the present invention.

FIG. 5 is a diagram of an example of a request 90 that includes a read/write (R/W) indication 92, an address 96, a source 97, a destination 98, identity of the cryptographic algorithm 100 (e.g., ID of the cryptographic client), and the cryptographic key type. If the R/W indication 92 is for write request, the request will also include the data 94 (e.g., a cryptographic key, a code word, or an initial vector) to be written. The address section 96 indicates the starting address of a block of x-bits (e.g., 64 bits).

The source section 97 indicates an initiator of the cryptographic result and the destination section 98 indicates where the cryptographic result will be sent. The valid sources and destinations include the system main memory, the key store section, the IO registers, and/or the graphics memory. The cryptographic algorithm being used may be identified as ANY, NONE, AES, DES, 3DES, Multi-2, DVB, C2, CSS, MDMI (HDCP), 1394(M6), RSA, ECC, and/or Register.

In an embodiment, an adjacent rule may be used. For instance, when a particular client initiates an encryption operation, the Rule Store determines what Key blocks in the Key Store can be accessed. By the improvement a further bit is included in the Rules whereby when the Rule is implemented, it determines the order in which the Key Store blocks may be accessed. More restrictively, a particular sequence of blocks is prescribed. Less restrictively, groups of Key Store blocks are accessed in a prescribed order.

Figure 6:
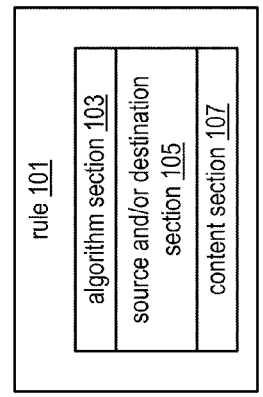
FIG. 6 is a diagram of an example of a rule in accordance with the present invention.

FIG. 6 is a diagram of an example of a rule 101 of a set of rules. The rule 101 includes an algorithm section 103, a source and destination section 105, and a content section 107. The algorithm section 103 identifies a valid algorithm that is entitled to access the key store section via a read request and/or a write request. For the given algorithm and request, the destination section 105 indicates one or more valid destinations that this algorithm may send its cryptographic result. The content section 107 identifies a valid cryptographic key type (e.g., a cryptographic key, a control word, and/or an initial vector).

In an embodiment, the rule store section 52 contains bit masks associated to Key Store blocks. The Bit Mapping for rules is as follows:

| Field | |
| --- | --- |
| Read Algorithm | See Algorithm List |
| Write Algorithm: | See Algorithm List |
| Destination | 110b = FB |
| | 101b = SYS, /IO |
| | 011b = Key_Store |
| | 000b = no output |
| Content Type | 1b = CW or Key |
| | 0b = IV |
| Source | 110b = FB |
| | 101b = SYS, /IO |
| | 011b = Key_Store |
| | 000b = no output |
| Adjacent | 0 = unrestricted, |
| | 1 = must be Adjacent |

Note:
if Algorithm = ANY then Bits {8, . . . , 15} are the rule is ignored.

| Algorithm | Description |
| --- | --- |
| ANY | Any Algorithm is permitted (note 00000b = OTP default). |
| AES | ECB, CBC, CTR, OFB, CFB |
| CSS | |
| DES, 2DES | ECB, CBC |
| 3DES | ECB, CBC |
| Multi-2 | |
| DVB | |
| C2 | |
| MDMI (HDCP) | |
| RSA | |
| ECC | |
| Register I/F | Register Interface |
| Reserved | |
| Reserved | |
| NONE | No Algorithm may access block. |

In this embodiment, a rule is a group of bits (e.g., 16) which dictates how a corresponding block (e.g., 64 bits) in the key store may be accessed. By default, since all bits in the OTP default to 0, the blocks that have un-initialized rules provide unlimited access (i.e. no restrictions).

With respect to an adjacent rule: it provides certain cryptographic clients the ability to write the result of a cryptographic operation back into the key store 50. This is may be useful in cases where the security system makes use of key ladders (e.g., a structure where a key is used to decrypt an encrypted key, the resulting decrypted key may then be used in a subsequent key ladder step or it may be used to decrypt content) and where the key is used to decrypt content is itself the end product of several cryptographic operations. In this context, the adjacent rule is used to enforce a particular order to be adhered to when deriving the key (i.e. the $1^{st}$ key must be adjacent to step 1 which must be adjacent to step 2, etc. . . . ) where the last step of the ladder culminates with the key intended to decrypt content. Note that the adjacent rule field more than 1 bit to indicate a range of adjacent locations (e.g., 5 bits to provide 32 adjacent locations). For example, instead of the result or an operation being permitted to be written to just the next (i.e. adjacent) location the rule has extra bits allocated that define the permission to write the result to the next N blocks (i.e. a plurality of adjacent locations). This adds flexibility when dealing with a multi stream system where multiple end keys are calculated using the same ladder.

Figure 7:
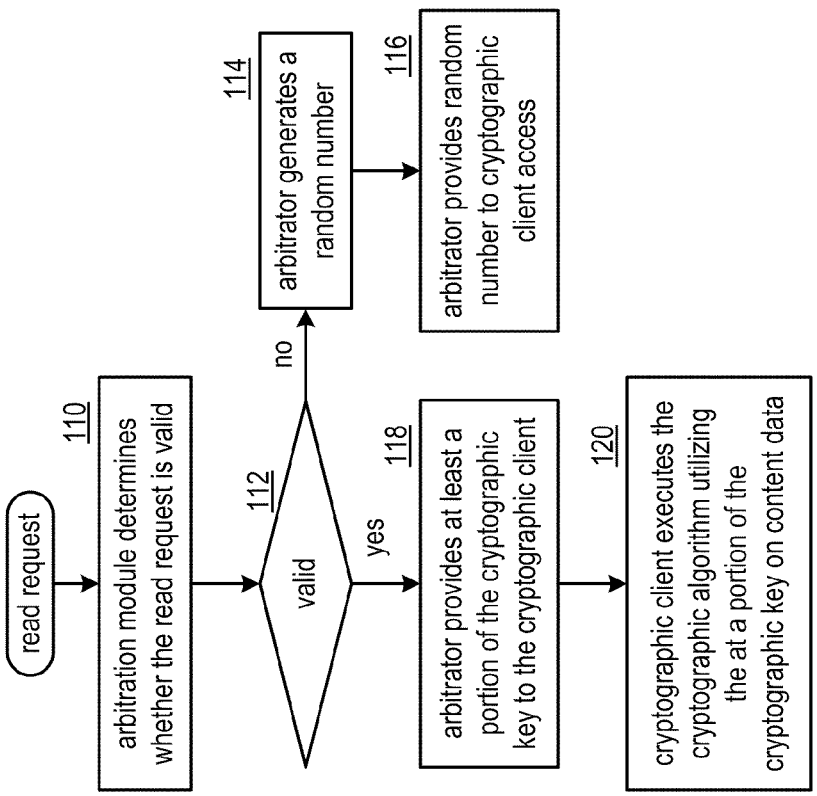
FIG. 7 is a logic diagram of an embodiment of a method for processing a read access request to a cryptographic key in accordance with the present invention.

FIG. 7 is a logic diagram of an embodiment of a method for processing a read access request to a cryptographic key that begins at step 110 where the key store arbitration module determines whether the request to read the cryptographic key is valid. This may be done by determining whether the requestor is authorized to make a request or in accordance with the rule set. If, at step 112, it is determined that the request is not valid, the method continues at step 114 where the arbitration module return a random number. The method then continues at step 116 where the arbitration module provides the cryptographic client access to the random number.

If the request is valid, the method continues at step 118 where the arbitration module provides at least a portion of the cryptographic key to the cryptographic client. For example, the key may be stored in multiple blocks and the arbitration module provides some or all of the blocks the cryptographic client in response to one request. The method continues at step 120 where the cryptographic client executes the cryptographic algorithm utilizing the at least a portion of the cryptographic key on content data to produce encrypted data or decrypted data. Note that, in an embodiment, even though a cryptographic client may make multiple requests and get portions of the key, it typically will use the entire key for a cryptographic operation.

Figure 8:
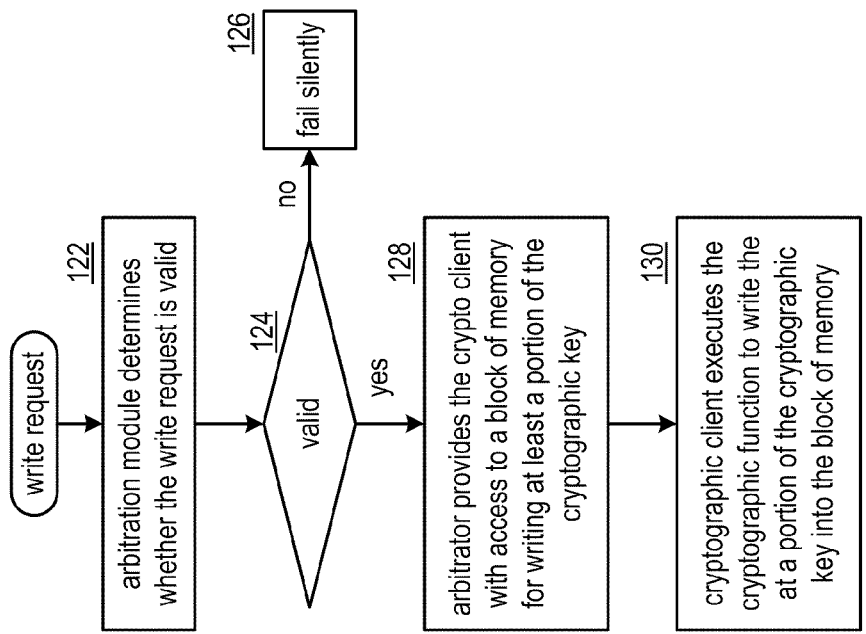
FIG. 8 is a logic diagram of an embodiment of a method for processing a write access request to a cryptographic key in accordance with the present invention.

FIG. 8 is a logic diagram of an embodiment of a method for processing a write access request to a cryptographic key that begins at step 122 where the arbitration module determines whether the request to write the cryptographic key is valid. This may be done in accordance with a rule of the rule set. If, at step 124 it is determined that the request is not valid, the method continues at step 126 where the request fails silently (e.g., no response is given, the request is ignored), or an error status is provided.

If, however, the request is valid, the method continues at step 128 where the arbitration module provides access to a block of memory in the key store memory for the at least a portion of the cryptographic key for the cryptographic client. The method continues at step 130 where the cryptographic client executes the cryptographic function to write the at least a portion of the cryptographic key into the block of memory.

Figure 9:
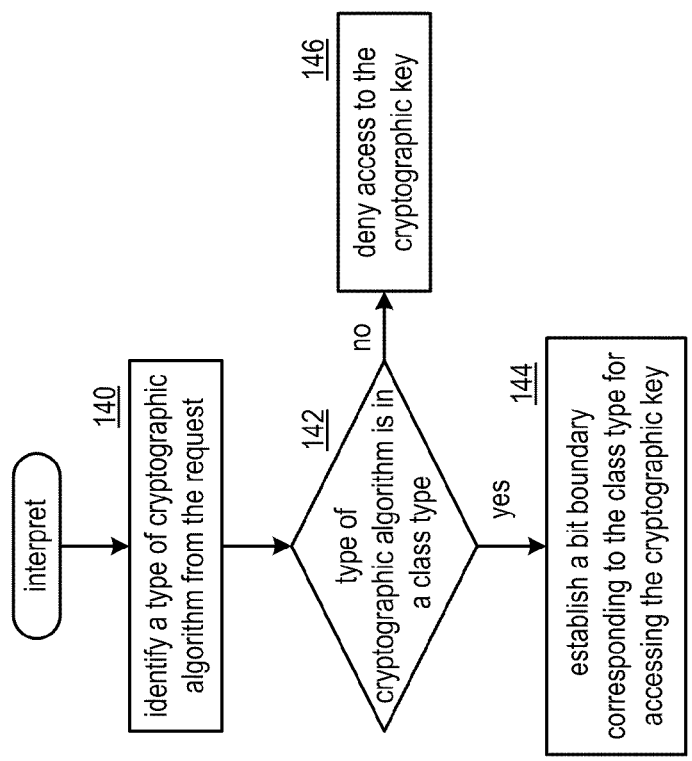
FIG. 9 is a logic diagram of an embodiment of a method for interpreting a request to a cryptographic key in accordance with the present invention.

FIG. 9 is a logic diagram of an embodiment of a method for interpreting a request to a cryptographic key that begins at step 140 where the arbitration module identifies a type of cryptographic algorithm from the request to access the cryptographic key. For example, cryptographic algorithms may be grouped into type categories. As a specific example, a first type may include ANY, DES, DVB, C2, CSS, M6, Multi-2, HDCP, Register; a second type may include AES, 3DES, ECC; a third type may include RSA; and a fourth type many include NONE.

The method branches at step 142 depending on whether the type of cryptographic algorithm is in a class type of a plurality of class types. If not, the method continues at step 146 where the request is denied. If, however, the type is in a class, the method continues at step 144 where the arbitration module establishes a bit boundary corresponding to the class type for accessing the cryptographic key. For example, If Algorithm={ANY, DES, DVB, C2, CSS, M6, Multi-2, HDCP, Register} then the Key Store may be accessed on a 64 bit boundary; If Algorithm={AES, 3DES, ECC} then the Key Store may be accessed on a 128 bit boundary; If Algorithm={RSA} then the Key Store may be accessed on a 1024 bit boundary; and If Algorithm={NONE} then the Key store may be not be accessed on any boundary.

Figure 10:
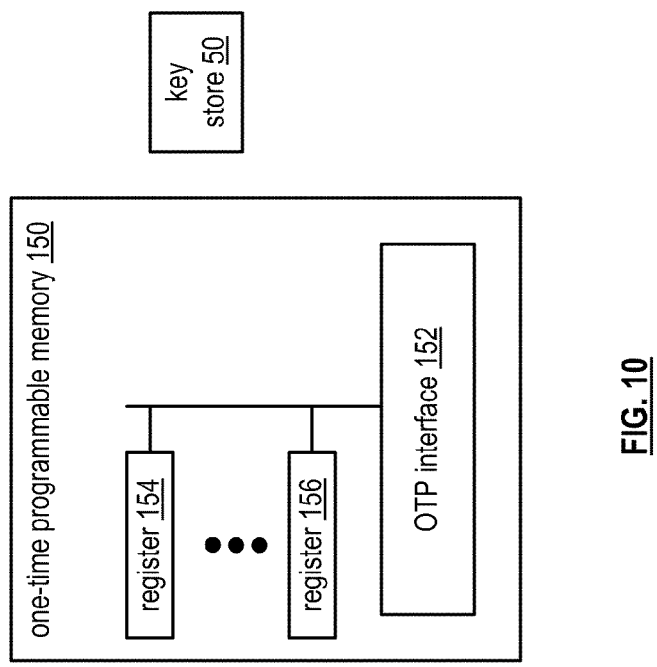
FIG. 10 is a diagram of an example of a one-time programmable memory in accordance with the present invention.

FIG. 10 is a diagram of an example of a one-time programmable memory 150 that includes an OTP interface 152, and a plurality of registers associated with the key store 50. In an embodiment, the OTP area (16K bits) is used to record Keys, CWs and IVs and various other values organized as 256 blocks of 64 bits each.

There is an OTP programming Interface which corresponds to a set of registers which permit reading or write 64 bits at a time into a specific OTP block. For every block there are 2 bits of associated OTP memory (i.e. the Read Lock Out Bits {0, . . . 255} and the Write Lock Out Bits {0, . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the register interface. When the corresponding write lock out bit is set form a=0 to a=1 then the associated 64 bit OTP block may never be written via the register interface.

This is a fundamental interlock required to secure secret values into the hardware device. There are a few scenarios;

| Read Lock Out | Write Lock Out | Use Case |
|---|---|---|
| 0 | 0 | In this case a block of OTP may be left completely unlocked and may be programmed in the field or at the factory with non security critical information. |
| 0 | 1 | In this case a block of OTP may be write protected but not read protected. A typical use for this scenario is to record a MAC address which is not secure (i.e. may be read) but should not be overwritten. |
| 1 | 0 | In this case a block of OTP is read protected but left writeable. A typical scenario for this is to provide a mechanism to revoke a system i.e. allow a Key to be over written in the field. |
| 1 | 1 | I this case a block of OTP is read and write protected. A typical scenario for this is to record keys within the OTP and disable f/w form ever reading or overwriting the key. |

Note that even if an OTP block's read write lock out bits are set the block may still be used by a cryptographic client within the hardware device (i.e. H/W blocks may use the key values to perform a cryptographic operation but the value itself may never be exposed).

During the initial writing the cryptographic key to the key store memory at step 50 from the OTP, the copy may utilize an obfuscation function. For example, blocks of 64 bits (i.e. Block[j]) which are to be written to the OTP (i.e. OTP[i]) are obfuscated using a function comprising symmetric binary operators (OP[n]) and a re-mapping function (i.e. [j]→[i]→[j]). The obfuscation function h( ) may be defined as follows:

$$OTP[i]=HKB[x]OP[y]Block[z]$$

The corresponding reverse-obfuscation function $h^{-1}( )$ implemented between the OTP and the Key Store uses the following obfuscation function.

$$KeyStore[z]=OTP[i]OP^{-1}[y]HKB[x]$$

Note that h( ) is a [j]op[j]→[i] mapping and $h^{-1}( )$ is a [i]op [j]→[j] mapping which means that the bit ordering in the Block[ ] and the HKB[ ] are different i.e. if a hacker had access to the Block value and the HKB value then the bit ordering would not correspond.

An obfuscation key block may be a 64 bit pattern written into one or more blocks of the OTP. The obfuscation key block may default to 0x0 . . . 0 and may be programmed uniquely per chip, or uniquely per customer, or uniquely per product or may default to 0x0 . . . 0. In addition, the obfuscation key block should have a similar number of 0's as 1's (+/−10%) (i.e. non trivial value) to ensure secure obfuscation.

The obfuscation functions may be used to secure the key store loading stage of secure key deployment. It allows for a secure way to embed keys in to OTP memory. This provides an important operational security mechanism which secures cryptographic values within the OTP and provides some security in the factory environment.

Figure 11:
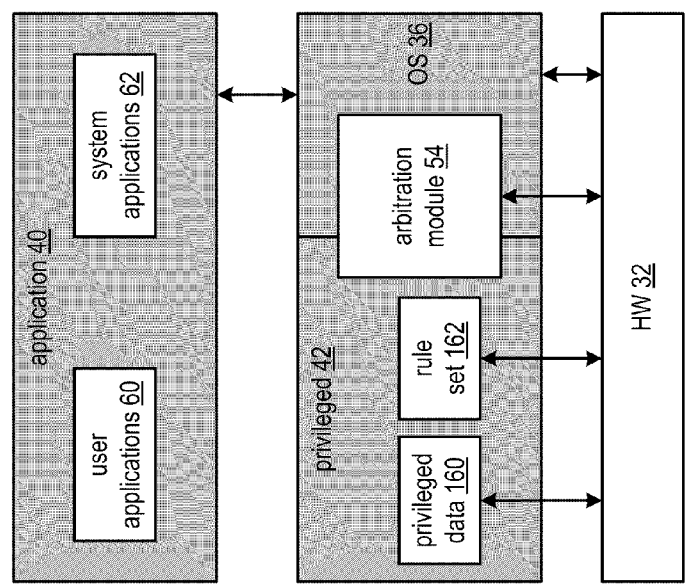
FIG. 11 is a schematic block diagram of another embodiment of a device in accordance with the present invention.

FIG. 11 is a schematic block diagram of another embodiment of a device that includes the hardware section (HW) 32 and the software section (SW) 34. In this embodiment, the software section 34 includes application section 40, an operating system 36, and the privileged section 42. The application section 40 includes a plurality of user applications 60 and a plurality of system applications 62.

The privileged memory section 42, which may be implemented using one or more one-time programmable memories, includes a privileged data section 160 and a rule set section 1622. The privileged data section 160 stores data that is of a privileged nature and should not be accessible to a user of the device or to a hacker. Such data includes one or more cryptographic keys for one or more of the cryptographic clients, other device security features, etc. The privileged data section 160 may include memory blocks, where one or more blocks store a privileged data element. The rule set section 162 stores rules for accessing the privileged data section 160.

The device of FIG. 11 also includes an arbitration module 54, which may be part of the operation system 36, stored in the privileged memory 42, and/or a separate module (e.g., a stand-alone state machine, a stand-alone processor, etc.). Regardless of its location, the arbitration module coordinates access to the privileged data section 160 based on the rule set. In this manner, access requests must come from authorized firmware components (e.g., real cryptographic clients, operating system firmware functions, other device security functions, etc.) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

Figure 12:
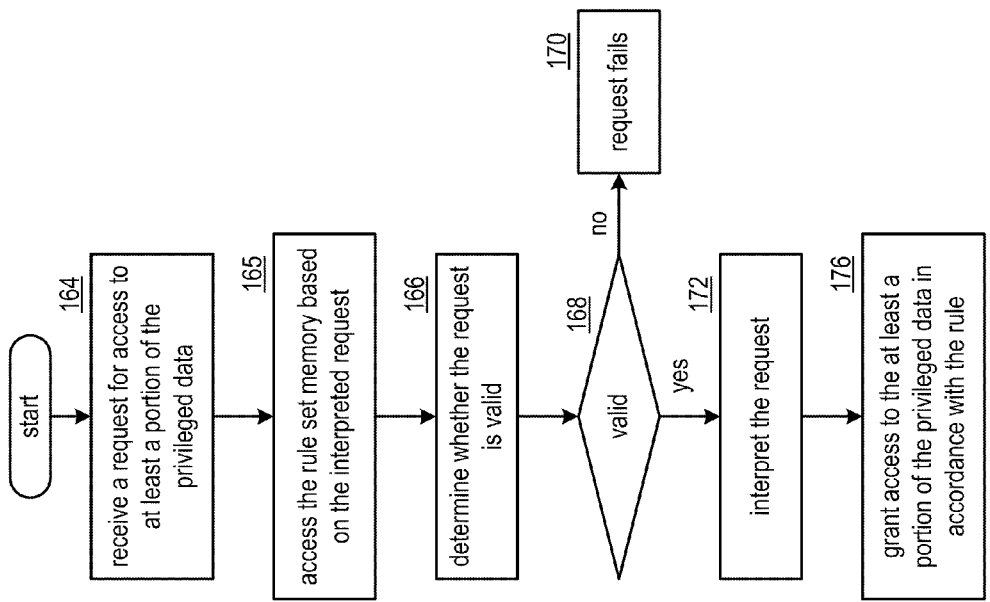
FIG. 12 is a logic diagram of an embodiment of a method for accessing privileged memory in accordance with the present invention.

FIG. 12 is a logic diagram of an embodiment of a method for accessing privileged memory that begins at step 164 where the arbitration module receives a request for access to at least a portion of the privileged data. The method continues at step 165 where the arbitration module accesses the rule set memory based on the interpreted request to retrieve a rule of the set of rules. Note that a rule of the set of rules includes an algorithm section that identifies one or more valid algorithms, a destination section that identifies a valid destination, and a content section that identifies a valid privileged data type.

The method continues at step 166 where the arbitration module determines whether the request is valid. This may be done by accessing the rule set based on the requestor and the type of request (e.g., read privileged data and/or to write privileged data). In addition, the arbitration module may verify the format of the request to insure that includes a read/write indication, an address of the at least a portion of the privileged data, and an indication regarding use of the privileged data. If any of these checks fail, the request is invalid and the method proceeds to step 170 via step 168, where the request fails. If, however, the request is valid, the method continues at step 172 where the arbitration module interprets the request to produce an interpreted request. The interpretation will be described in greater detail with reference to FIG. 15. The method continues at step 176 where the arbitration module grants access to the at least a portion of the privileged data in accordance with the rule.

Figure 13:
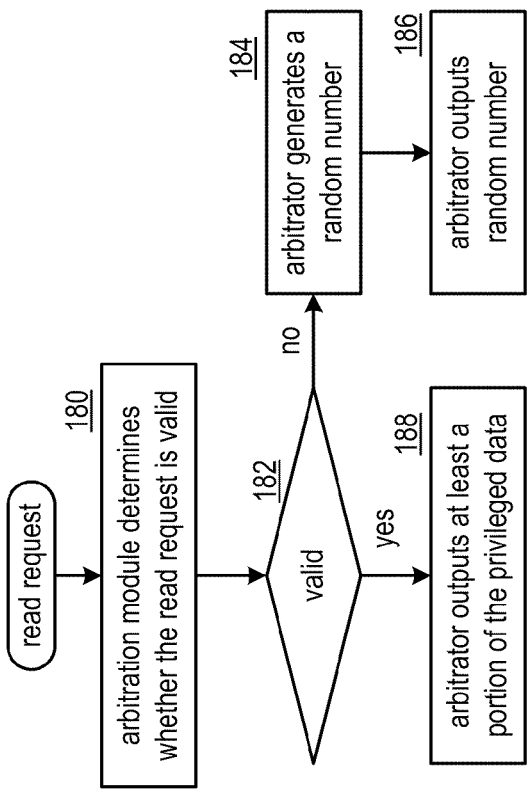
FIG. 13 is a logic diagram of an embodiment of a method for processing a read request to access privileged memory in accordance with the present invention.

FIG. 13 is a logic diagram of an embodiment of a method for processing a read request to access privileged memory that begins at step 180 where the arbitration module determines whether the request to read is valid. This may be done by accessing an appropriate rule from the rule set. The method branches at step 182 depending on whether the request is valid. If not, the method continues at step 184 where the arbitration module generates a random number. The method continues at step 186 where the arbitration module outputs the random number as the at least a portion of the privileged data. When the request to read is valid, the method continues at step 188 where the arbitration module outputs the at least a portion of the privileged data.

Figure 14:
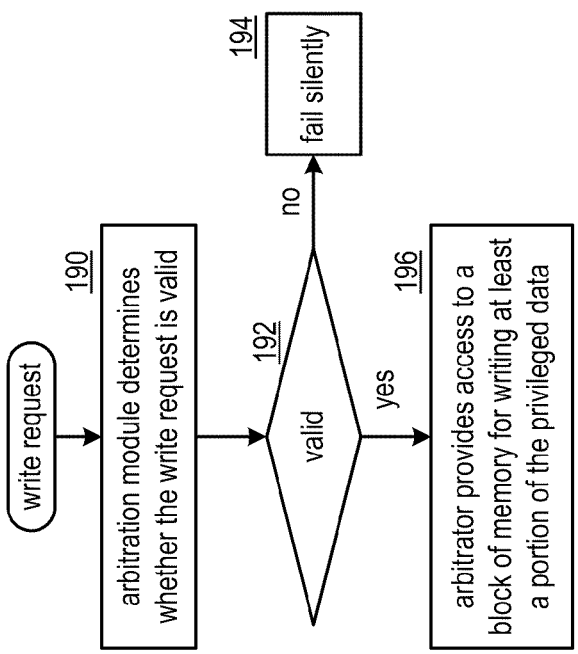
FIG. 14 is a logic diagram of an embodiment of a method for processing a write request to access privileged memory in accordance with the present invention.

FIG. 14 is a logic diagram of an embodiment of a method for processing a write request to access privileged memory that begins at step 190 where the arbitration module determines whether the request to write is valid. This may be done by accessing an appropriate rule from the rule set. The method branches at step 192 depending on whether the request is valid. If not, the request fails silently at step 194. When the request to write is valid, the method continues at step 196 where the arbitration module provides access to a block of memory in the privileged memory for the at least a portion of the privileged data.

Figure 15:
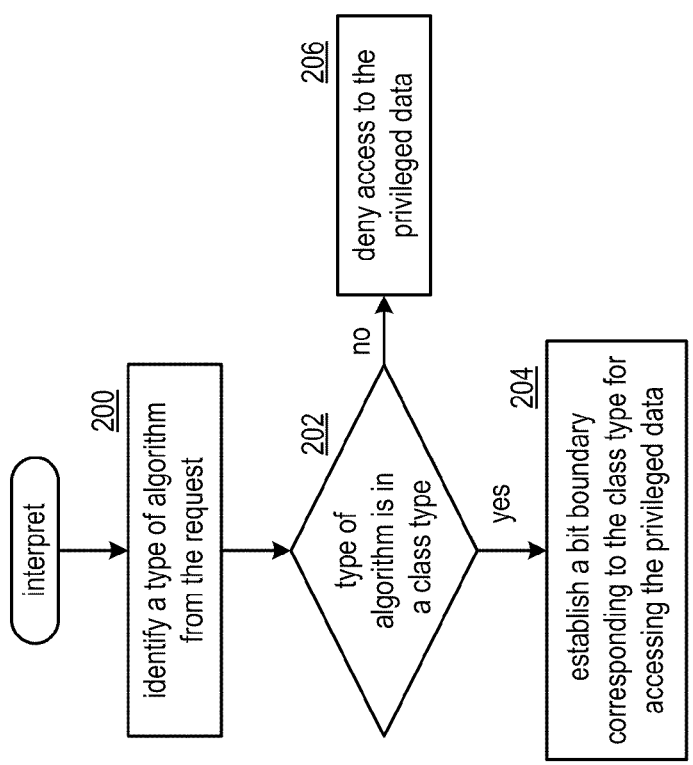
FIG. 15 is a logic diagram of an embodiment of a method for interpreting a request to access privileged memory in accordance with the present invention.

FIG. 15 is a logic diagram of an embodiment of a method for interpreting a request to access privileged memory that begins at step 200 where the arbitration module identifies a type of algorithm from the request (e.g., a system level application, an operating system function, a cryptographic algorithm, etc.). The method continues at step 202 where the arbitration module determines whether the type of algorithm making the current request is within one of the types of algorithms. When it is not, the method continues at step 206 where the request is denied. When the type of algorithm is in a class type of a plurality of class types, the method continues at step 204 where the arbitration module establishes a bit boundary corresponding to the class type. For example, a first class may access the privileged memory a block at a time, a second class may access the privileged memory x-blocks at a time, etc.).

Figure 16:
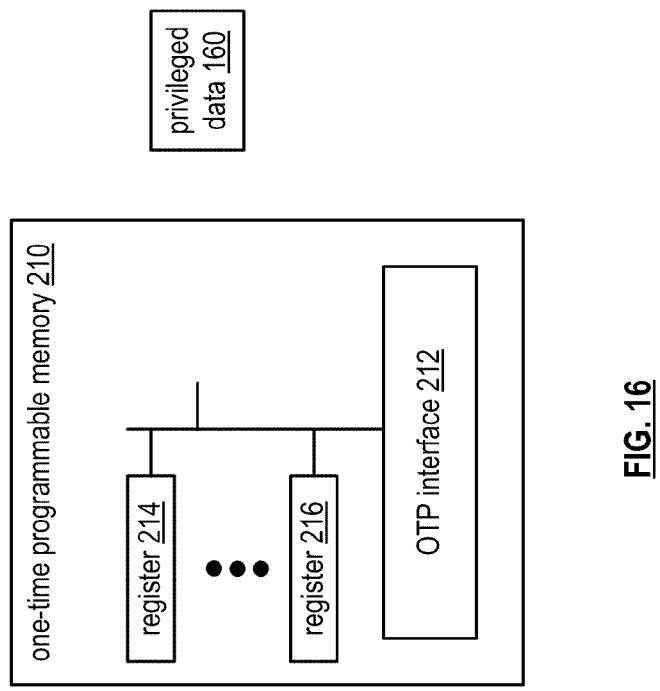
FIG. 16 is a diagram of another example of a one-time programmable memory in accordance with the present invention.

FIG. 16 is a diagram of another example of one or more one-time programmable memories 210 that includes the privileged data section 1600, an OTP interface 212, and a plurality of registers 214-216. In an embodiment, the OTP area (16K bits) is used to record Keys, CWs and IVs and various other values organized as 256 blocks of 64 bits each. There is an OTP programming Interface which corresponds to a set of registers which permit reading or write 64 bits at a time into a specific OTP block. For every block there are 2 bits of associated OTP memory (i.e. the Read Lock Out Bits {0, . . . 255} and the Write Lock Out Bits {0, . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the register interface. When the corresponding write lock out bit is set form a=0 to a=1 then the associated 64 bit OTP block may never be written via the register interface.

A further embodiment may include an additional multi-bit field for encrypt/decrypt that specifies whether a cryptographic client is required to perform an encrypt or decrypt operation (e.g., ANY=00, Encrypt=10, Decrypt=01, NONE=11). A least constraining state is the 00 (un-programmed state) and a most constraining state is 11 (None).

Another embodiment may include increasing the size of the read and write algorithm field from 4 bits to 6 bits to specify 64 different algorithms, which allows for many more algorithms to be added.

In another embodiment, a skip function may be used to reduce the number of one time programming (OTP) steps required to populate the Key Store by loading one root key into the Key Store and then having the keys for other sections of the key ladder calculated from the root rather than having them all loaded during successive steps of the OTP process. In this way, certain OTP steps are obviated.

In yet another embodiment, a repeat function may be used to avoid redundancy. For instance, the OTP block includes an indicator stored with certain of the Rules in the Rule Store to indicate whether that Rule is to be repeated to load it in other locations in the Key Store ladder. Once again, this obviates the requirement of having an OTP step for every location in the Key Store ladder.

In a further embodiment, an Encrypt/Decrypt rule may be used. In particular, a pair of bits are added to each Rule which signify that the client can encrypt and decrypt (00), that the client can do one of encrypt and decrypt (1,0) and (0,1), and that the client can copy, but not encrypt or decrypt, the result to another location in the Key Store.

In an additional embodiment the adjacency constraint can be expanded to define additional types such as CW/Key, IV, Data, Any, None or other types.

In yet a further embodiment, the type constraint can be expanded to define a range of adjacency, not just the immediate next.

Figure 17:
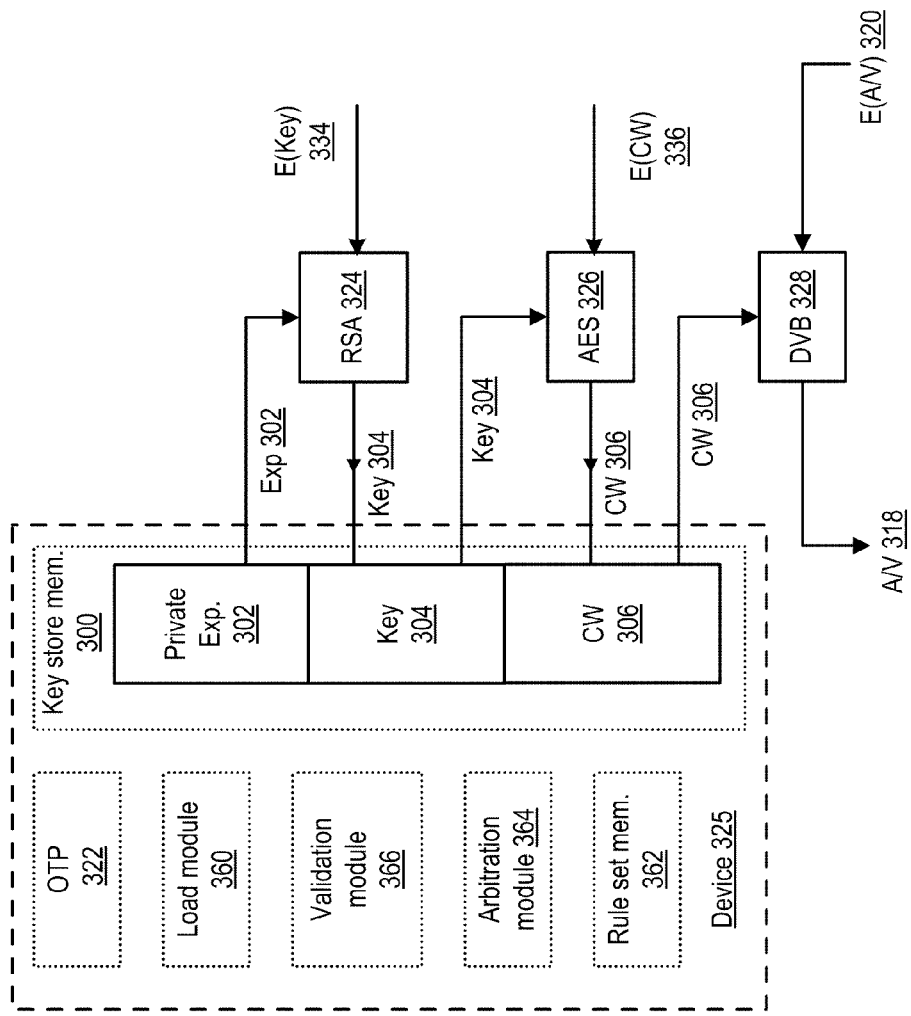
FIG. 17 is a diagram of an example of a key ladder in accordance with the present invention.

FIG. 17 is a diagram of an example of a key store in accordance with the present invention used to implement key ladder. In particular, a device 325 is shown that incorporates one or more of the functions and features described in conjunction with FIGS. 1-16. In particular, the device 325 is used to implement a key ladder for use in conditional access (CA), digital rights management (DRM) or other security application in conjunction with Rivest, Shamir, Adelman (RSA) module 324, and Advanced Encryption Standard (AES) module 326 on a single system on a chip (SOC). In this example, a typical broadcast system key ladder is shown where every deployed CA system has a unique Private RSA key, such as private exponent 302. The implementation of such a key ladder on an SOC provides an obvious improvement in security and economy since there is now a single SOC device rather than two or more devices with a communication link between them. The key ladder itself provides several architectural security improvements. An important side benefit is that DRM's can be implemented using such a key ladders, the security level is brought up to the standard typically required by CA vendors. The various advantages of the present approach will be apparent to those skilled in the art when presented the discussion that follows.

In the example shown, an application, utility or other software supplies encrypted key 334 and encrypted codeword 336 that are decrypted in the key ladder based on private exponent 302 to generate codeword 306. The codeword 306 is used in this example to descramble an encrypted audio/video (A/V) data 320 such as from a transport stream de-multiplexor (TSD) in digital video broadcast module 328 to generate audio/video data 318 that can be written to a frame buffer memory.

In operation, key store memory 300 stores cryptographic keys of the key ladder. This can include prestored keys such as private exponent 302 used by RSA module 302 to extract key 304 from encrypted key 334. In addition, key store 300, such as key store 50, can store key 304, and codeword 306 generated in AES module 326 by decrypting encrypted codeword 336 based on key 304. Rule set memory 362, such as rule set 52, stores a set of rules for accessing the cryptographic keys of key store 300 used in conjunction with the key ladder. Key store arbitration module 364, such as arbitration module 54, operates based on the rules in rules set memory 362 to control access to key store memory 300. In particular, arbitration module 364 allows reading and writing the keys stored in key store memory 300 only in accordance with the set of rules. Examples of such rules are set forth in conjunction with FIGS. 4, and 7-9 and otherwise, while specific examples are presented below.

In a particular embodiment, there is a different set of rules (constraints) for each of the three portions of the key store memory 300 which dictate how values in that portion may be used. The definition of the ladder is based on rules which are hard coded into one-time programmable memory (OTP) 322 rather than being hard wired into a chip. These constraints enforce the specific sequence of operations which is equivalent to the security provided by a hard wired key ladder.

For instance, private exponent portion of key store memory 300 has constraints which enforce the value to be loaded from OTP 322 (Write Rule=OTP), the value may only be used by the RSA module 324 (Read Rule=RSA), the value may only be used as a Key (Type=Key), the RSA operation must read a value E(Key) from the frame buffer (Source=FB) and the result of the RSA calculation (Key=(E(Key))^EXP mod n) must be written to the key store memory 300 (dest=KS), the RSA operation is a Decryption (i.e. E/D=D) the location of Key 304 must be adjacent to the location of private exponent 302 (adjacent=1).

Similarly, the key portion of key store memory 300 has constraints which enforce the value to be the result of an operation of RSA module 324 (Write Rule=RSA), the value may only be used by the AES module 326 (Read Rule=AES), the value may only be used as a Key (Type=Key), the AES operation must read a value E(CW) from the frame buffer (Source=FB) and the result of the AES calculation (i.e. CW=AES(E(CW,Key)) must be written to the key store memory 300 (dest=KS), the AES operation must be a Decryption (i.e. E/D=D) the location of codeword 306 must be adjacent to the location of key 304 (adjacent=1).

In addition, the codeword portion of the key store memory 300 has constraints which enforce the value to be the result of an operation of AES module 326 (Write Rule=AES), the value may only be used by the DVB module 328 (Read Rule=DVB), the value may only be used as a Key (Type=Key), the DVB operation must decrypt content received from an I/O device (i.e. source=I/O) and the resulting decrypted content must be written to the frame buffer (dest=FB), the DVB operation must be a Decryption (i.e. E/D=D) the CW 306 may not be used to derive any further key store locations (adjacent=NONE).

The rules can also have fields which allow for de-compression of rule set and key values when loading the rule set memory 362 and key store memory 300. These constraints are referred to as the SKIP and REPEAT fields and generally permit 1:N mapping of OTP 322 storage to key store memory 300 and rule set memory 362. This allows for more optimum use of OTP 322. Examples of such fields are presented below:

SKIP: In the example discussed above, note that only the private exponent 302 has a prestored value which is read from the OTP 322. It is typical in key ladders for there to be a root value which is stored within the chip (i.e. persistent) and subsequent values are derived (i.e. have no default value). In this case it would be wasteful to allocate locations in the OTP 322 to record default values for other locations in the key store memory and so the SKIP field is used to direct the load module 360 to skip over locations in key store memory 300 that correspond to derived keys (i.e. don't initialize them).

REPEAT: In the example discussed above, note that the granularity of the key store memory may be different for various algorithms (i.e. DVB 328 uses 64 bit codewords, AES uses 128 bit keys and the RSA may use 1024 bit exponents). In order to accommodate the varying granularity the REPEAT field is used to direct the load module 360 to apply the same rule to multiple locations of rule set memory 362.

As previously discussed, device 325 includes OTP 322 for storing the prestored key or keys and the set of rules. Load module 360 controls the loading of key store memory 300 with the prestored key or keys and the rule set memory 362 with the set of rules. In an embodiment of the present invention, the set of rules includes a signature rule that defines at signature corresponding to at least one of: the set of rules and the at least one cryptographic key. The validation module 366 validates, based on the signature, the loading of the prestored keys in the key store memory 300 and/or the loading of the rule set memory 362. Further details regarding this aspect of the invention will be discussed in conjunction with FIGS. 18 and 19 that follow.

While shown in conjunction with descrambling of broadcast A/V data, the key ladder shown could likewise be used for encrypting or decrypting other media data, multimedia data or other data to be protected. In particular, nearly all CA and DRM systems may be expressed as a key ladder (i.e. they may have more or less stages and/or may use different specific algorithms). The reason for this is that such security systems are based on a root of trust philosophy where trust is propagated though various stages from most trusted to less trusted. A key ladder is a natural extension of standard cryptographic philosophy. There are proprietary systems which operate with Smart Cards or Cable Cards and use secret algorithms and undocumented protocols and are usually associated with set top boxes distributed by Broadcasters where the CA system is used to control access to only valid customers. On the other hand, DRM systems are generally based on published standards like AACS, DTCP, CPRM, etc. These systems use standard published algorithms and licensed device keys and are usually associated with consumer electronics devices like players or networked devices which are distributed as retail devices. One thing CA and DRM systems have in common is that they can both be expressed as a key ladder i.e. they have a root key (usually stored in Non Volatile Memory) which is used to cryptographically qualify derived intermediate keys which are then used to qualify final keys which are used to de-scramble A/V content.

Figure 18:
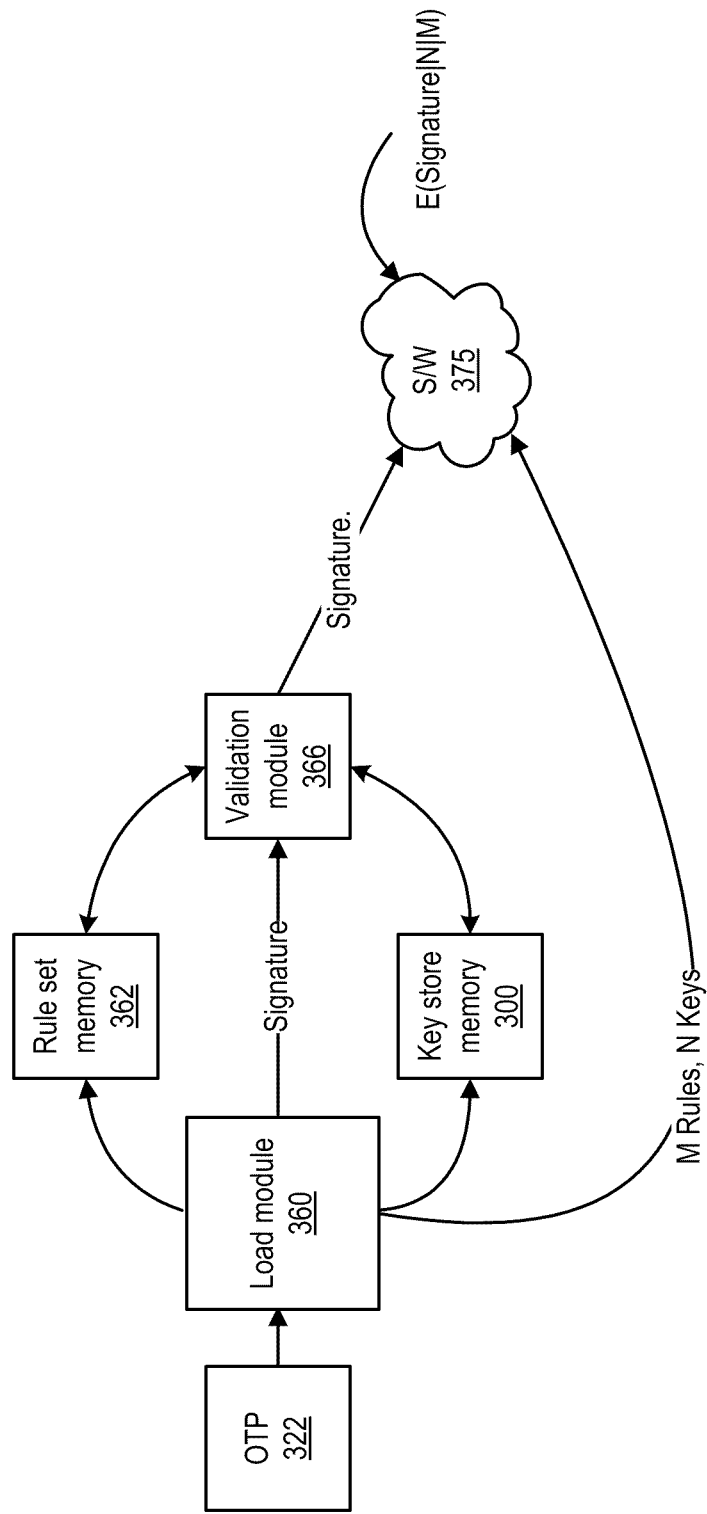
FIG. 18 is a diagram of an example of a device in accordance with the present invention.

FIG. 18 is a diagram of an example of a device in accordance with the present invention. In order to make use of the set of rules and the keys that are stored in OTP 322, these values must be loaded in a high speed random access device such as a static random access memory (SRAM). In this embodiment, rule set memory 362 and key store memory 300 are implement using one or more such memory devices and load module 360 and validation module 366 are implemented via state machines, however, other hardware devices can be used provided that they can be implemented with an appropriate level of security.

An obvious point of attack is the storage of rules and keys. Procedures are put in place to protect against hackers modifying or adding rules or keys. During the loading process, load module 360 reads the OTP 322 and determines the number of rules (M), extracts the signature from the signature rule, and then copies the rule set into the rule set memory 362. Along with the rules, the load module 360 will also determine the number of prestored keys (N) and load the prestored keys into the key store memory 300. When complete, the load module 360 will report the number of rules M and keys N which have been loaded to software 375. After the loading is complete, the validation module 366 will receive the signature value from the load module 360 and perform a hardware hash check. For example, the load module 360 can evaluate the signature of the key store memory 300 and the rule store memory 362 and compare it against the signature embedded within the signature rule. If the two signatures do not match the validation module 366 can take action to disable access to the keys and the rule set (e.g. erase the key store memory 300 and the rule set memory 362).

If the keys and rule set are validated, the validation module 366 will also make the signature value available to a software function 375 to perform a software hash check. The software function 375 can be a separate utility or embedded in the operating system, an application or in other software. Software 375 can be implemented as a process on a single SOC that includes the other components presented in conjunction with FIG. 17 or can run on another device. Software 375 reads the signature calculated by the load module 360, the number of rules M and number of keys N, and uses this information to construct a message digest and perform a asymmetric signature of the contents of the key store memory 300 and rule set memory 362. For example an RSA-based signature check may be defined as:

Digest=Hash value|#rules|#keys

Signature=Digest^exp mod $n$

This mechanism allows a trusted authority to define correct signature and number of rules and keys have been processed (i.e. to prevent hackers from altering or adding rules or keys). If this second signature check fails, then the software 375 takes action to disable the system. Note: there are various possible hash functions and various possible asymmetrical functions which may be used.

The rule set can include the following special rules which are used by the load module 360:

End of Rules Rule (EOR): there is a default Rule (ALL Zeros) which defines the end of rules within the OTP 322. This rule is intentionally set be equivalent to the default value of the OTP 322 i.e. in an un-initialized chip the $1^{st}$ rule encountered would be an End Of Rules rule (EOR) indicating there are no rules defined. This mechanism also permits additional rules to be defined after some rules have been defined i.e. the unused space may be used to add additional rules after the chip has been provisioned.

Signature Rule: this is a custom rule which is used to define the signature of the rules and keys stored in OTP 322. It is assumed that a typical attack vector would be for a hacker to attempt to modify the rules in OTP 322 and so this mechanism is used to define the expected signature of the contents of the rule set and keys stored into the OTP 322 thus providing a mechanism to assure the integrity of rule set and keys as they reside in the OTP 322. The signature algorithms can be CRC32, SHA1, SHA256, or other block codes, checksums or error detection algorithm.

NULL Rule: this rule is provided to define an unused rule which may be used to fill the rule storage in OTP 322, i.e. to disable the ability to add additional rules after provisioning.

The device architecture of the present invention also provides the option to implement multiple CA and DRM systems on the same system on a chip (SOC). This is an important distinction where a customer could field a system containing a single SOC which is provisioned with keys and key ladders which implement more than one CA or DRM system. This provides the customer with a remarkable economy and flexibility since the CA/DRM systems can share resources and co-exist at the same time.

It is common in the CA industry to have breaches of security. The typical response in this situation in prior art removable CA systems is to distribute new smart cards or cable cards to customers. These removable CA systems typically implement a new key ladder or contain new keys. In the system of the present invention, an 'End of Rules' rule can be implemented that defines un-programmed space in the rule and key areas of the OTP 322. In the case of a security breach, it is feasible to download new rules and new keys to update the OTP 322 of previously fielded SOC chips, in effect downloading a new CA or DRM system to previously fielded systems. This provides the customer with a remarkable economy and flexibility since the CA/DRM systems can be renewed without a large expense. The Renewed CA or DRM system may be downloaded to fielded products via various communication channels (for example Cable/Satellite/Terrestrial RF links, the Internet, or via media such as DVD's and BD disks).

It is also common to selectively disable fielded products usually because they have been identified as being used by hackers; this is referred to as revocation. Since the architecture of the present invention is based on the contents of OTP 322 and these contents can be used to record unique chip ID's. It is possible to identify and disable individual SOC devices. The hard coded key ladder approach provides new methods for revoking devices i.e.

Keys may be changed
    (i.e. without the new key the SOC stops working)

Key Ladders may be changed
    (i.e. without the new Ladder the SOC stops working)

Signature Check
    (i.e. without the new Signature the SOC stops working)

In effect since the architecture of the present invention supports renewability, this creates new and flexible methods for revoking SOC's.

Figure 19:
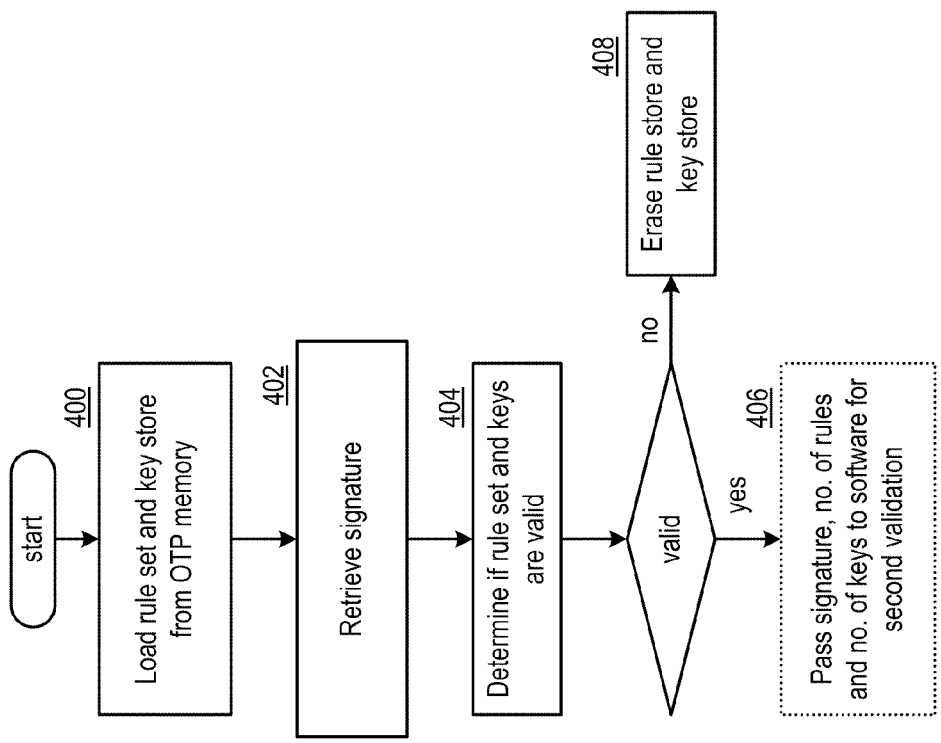
FIG. 19 is a logic diagram of an embodiment of a method for loading and validating keys and rule sets in accordance with the present invention.

FIG. 19 is a logic diagram of an embodiment of a method for loading and validating keys and rule sets in accordance with the present invention. In particular a method is presented for use in conjunction with one or more functions and features presented in conjunction with FIGS. 1-18. In step 400, at least one cryptographic key is loaded from at least one one-time programmable memory to a key store memory. In addition, a set of rules from the one-time programmable memory is loaded in a rule set memory. The set of rules can include a signature rule that defines a first signature. In step 402, the first signature is retrieved. In step 404, the validity of the set of rules stored in the rule set memory the cryptographic key or keys stored in the key store memory is determined. In step 408, the key store memory and the rule set memory are erased, based on a failed validation of at least one of: the set of rules stored in the rule set memory; and the cryptographic key or keys stored in the key store memory.

In optional step 406, the number of rules in the set of rules is determined along with the number of cryptographic keys. The first signature, and the number of rules in the set of rules stored in the rule set memory and the number of cryptographic keys stored in the key store memory are passed for further validation, such as a second security check.

In an embodiment of the present invention, step 404 includes: determining a second signature based on the set of rules stored in the rule set memory, and the at least one cryptographic key stored in the key store memory; comparing the first signature to the second signature; and determining the failed validation when the second signature does not match the first signature.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device comprises:
    a key store memory operable to store at least one cryptographic key;
    a rule set memory operable to store a set of rules for accessing the at least one cryptographic key, wherein the set of rules includes a signature rule that defines at signature corresponding to at least one of: the set of rules and the at least one cryptographic key;
    a key store arbitration module operable to grant access to the cryptographic key in accordance with the set of rules;
    at least one one-time programmable memory;
    a load module, coupled to the at least one one-time programmable memory and the key store memory, that transfers the at least one cryptographic key from the at least one one-time programmable memory to the key store memory; and
    a validation module, coupled to the key store memory, that validates the at least one cryptographic key stored in the key store memory, based on the signature.

2. The device of claim 1 wherein the load module further transfers the set of rules from the at least one one-time programmable memory to the rule set memory.

3. The device of claim 2 wherein the validation module, is further coupled to the rule set memory, and the validation module further validates the set of rules stored in the rule set memory, based on the signature.

4. A method comprising:
    storing at least one cryptographic key from the at least one one-time programmable memory to a key store memory;
    storing a set of rules from the at least one one-time programmable memory to a rule set memory, wherein the set of rules includes a signature rule that defines a first signature;
    retrieving the first signature;
    determining the validity of:
        the set of rules stored in the rule set memory; and
        the at least one cryptographic key stored in the key store memory;
    erasing the key store memory and rule set memory, based on a failed validation of at least one of:
        the set of rules stored in the rule set memory; and
        the at least one cryptographic key stored in the key store memory.

5. The method of claim 4 wherein determining the validity includes:
    determining a second signature based on the set of rules stored in the rule set memory, and the at least one cryptographic key stored in the key store memory;
    comparing the first signature to the second signature; and
    determining the failed validation when the second signature does not match the first signature.

* * * * *